(12) United States Patent
Baltz, Jr. et al.

(10) Patent No.: US 10,774,545 B2
(45) Date of Patent: *Sep. 15, 2020

(54) VENTILATION SCREED DEVICE AND ASSEMBLY

(71) Applicant: Alabama Metal Industries Corporation, Birmingham, AL (US)

(72) Inventors: Gary George Baltz, Jr., Mountain Brook, AL (US); Frederic C. Mayer, Jr., Hoover, AL (US)

(73) Assignee: ALABAMA METAL INDUSTRIES CORPORATION

(*) Notice: Subject to any disclaimer, the term of this patent is extended or adjusted under 35 U.S.C. 154(b) by 0 days.

This patent is subject to a terminal disclaimer.

(21) Appl. No.: 16/534,704

(22) Filed: Aug. 7, 2019

(65) Prior Publication Data

US 2020/0063446 A1 Feb. 27, 2020

Related U.S. Application Data

(63) Continuation of application No. 16/194,775, filed on Nov. 19, 2018, now Pat. No. 10,533,324.
(Continued)

(51) Int. Cl.
*E04F 19/04* (2006.01)
*E04B 1/70* (2006.01)

(52) U.S. Cl.
CPC ............ *E04F 19/04* (2013.01); *E04B 1/7038* (2013.01); *E04B 1/7076* (2013.01); *E04F 2019/0445* (2013.01)

(58) Field of Classification Search
CPC ...... E04B 1/7038; E04B 1/7076; E04F 19/04; E04F 2019/0445
See application file for complete search history.

(56) References Cited

U.S. PATENT DOCUMENTS 2,645,824 A 7/1953 Titsworth
2,664,057 A * 12/1953 Ausland .............. E04D 13/1415
52/61
(Continued)

FOREIGN PATENT DOCUMENTS

AU 2008202082 A1 11/2008
CA 2777166 A1 11/2012
(Continued)

OTHER PUBLICATIONS

From U.S. Appl. No. 15/446,732—cited as "Prior Art Weep Screed from Google Search 1 page: dated 2004".
(Continued)

*Primary Examiner* — Adriana Figueroa
(74) *Attorney, Agent, or Firm* — Jennifer Meredith, Esq.; Lippes Mathias Wexler Friedman, LLP

(57) ABSTRACT

A ventilation screed comprising an upper attachment flange having a top portion and a bottom portion and at least one opening in the top portion; a drip edge protruding from the bottom portion of the upper attachment flange; a drainage cavity protrusion protruding from the bottom portion of the upper attachment flange above the drip edge, wherein the drainage cavity protrusion has a vertical portion of a L-shaped drainage trough portion and a bottom portion having at least one drainage opening along a meeting point of the upper attachment flange and the drainage cavity protrusion, an upper ground portion in communication with the L-shaped drainage trough portion and a drainage cavity shroud in communication with the upper ground portion, wherein the drainage cavity shroud extends past the drip edge.

15 Claims, 14 Drawing Sheets

Related U.S. Application Data

(60) Provisional application No. 62/592,612, filed on Nov. 30, 2017.

(56) References Cited

U.S. PATENT DOCUMENTS

| | | | |
|---|---|---|---|
| 2,905,072 A * | 9/1959 | Oswald | E04B 1/7076 454/276 |
| 3,206,806 A | 9/1965 | Powell | |
| 3,343,323 A | 9/1967 | Mayfield | |
| 3,568,391 A | 3/1971 | Conway | |
| 4,924,647 A | 5/1990 | Drucker | |
| 5,630,297 A * | 5/1997 | Rutherford | E04B 1/66 52/371 |
| 5,694,723 A | 12/1997 | Parker | |
| 5,809,731 A | 9/1998 | Reiss | |
| 5,836,135 A | 11/1998 | Hagan | |
| 5,970,671 A * | 10/1999 | Bifano | E04B 1/765 428/603 |
| 6,018,924 A | 2/2000 | Tamlyn | |
| 6,119,429 A | 9/2000 | Bifano | |
| 6,293,064 B1 | 9/2001 | Larson | |
| 6,298,609 B1 * | 10/2001 | Bifano | E04B 1/765 52/101 |
| 6,308,470 B1 | 10/2001 | Durkovic | |
| 6,385,932 B1 | 5/2002 | Melchiori | |
| 6,410,118 B1 | 6/2002 | Reicherts | |
| 6,470,638 B1 | 10/2002 | Larson | |
| 6,792,725 B1 | 9/2004 | Rutherford | |
| 6,823,633 B2 | 11/2004 | Ryan | |
| 6,964,136 B2 * | 11/2005 | Collins | E04B 1/70 52/204.2 |
| 7,219,477 B2 | 5/2007 | Leffler | |
| 7,546,719 B1 | 6/2009 | Guevara | |
| 7,584,587 B2 | 9/2009 | Ouellette | |
| 7,621,079 B2 | 11/2009 | Kyozaburo | |
| 7,634,883 B1 * | 12/2009 | Larson | E04F 13/06 52/393 |
| 7,673,421 B2 * | 3/2010 | Pilz | E04F 13/06 52/302.6 |
| 7,743,575 B2 | 6/2010 | Ito | |
| 7,810,291 B2 | 10/2010 | McPherson | |
| 8,281,530 B2 | 10/2012 | Chaussee | |
| 8,578,660 B2 | 11/2013 | Nolan | |
| 8,584,416 B2 * | 11/2013 | Chenier | E04F 13/06 52/393 |
| 8,596,019 B2 | 12/2013 | Aitken | |
| 8,646,222 B2 | 2/2014 | Carbonaro | |
| D700,717 S | 3/2014 | Campacci | |
| 8,726,594 B2 | 5/2014 | Salazar | |
| 8,813,443 B2 | 8/2014 | Goldberg | |
| 8,919,062 B1 | 12/2014 | Viness | |
| 8,943,761 B2 | 2/2015 | Carbonaro | |
| 9,140,008 B2 | 9/2015 | Fischer | |
| 9,366,040 B2 | 6/2016 | Singh | |
| 10,024,063 B2 * | 7/2018 | Friel | E04F 13/06 |
| 10,060,126 B2 * | 8/2018 | Collins | E04B 1/765 |
| 10,196,812 B1 * | 2/2019 | Duffy | E04F 13/007 |
| 2003/0126810 A1 | 7/2003 | Brunson | |
| 2003/0177736 A1 | 9/2003 | Gatherum | |
| 2006/0123723 A1 | 6/2006 | Weir | |
| 2006/0277854 A1 | 12/2006 | Egan | |
| 2007/0044402 A1 | 3/2007 | Hess | |
| 2007/0062137 A1 * | 3/2007 | Maylon | E04F 13/06 52/367 |
| 2008/0104918 A1 * | 5/2008 | Gleeson | E04B 1/74 52/489.1 |
| 2009/0183453 A1 | 7/2009 | Koessler | |
| 2010/0101168 A1 | 4/2010 | Hohmann | |
| 2010/0287861 A1 | 11/2010 | Goldberg | |
| 2011/0252731 A1 | 10/2011 | Boyer | |
| 2011/0302863 A1 | 12/2011 | Sourlis | |
| 2012/0066984 A1 | 3/2012 | Thompson | |
| 2012/0066986 A1 | 3/2012 | Thompson | |
| 2013/0125487 A1 | 5/2013 | Power | |
| 2015/0013257 A1 | 1/2015 | Power | |
| 2015/0027074 A1 | 1/2015 | Preston | |
| 2017/0030072 A1 | 2/2017 | Corson | |
| 2017/0226732 A1 | 8/2017 | Collins | |
| 2017/0254091 A1 | 9/2017 | Friel | |

FOREIGN PATENT DOCUMENTS

| | | |
|---|---|---|
| JP | 2657037 B2 | 9/1997 |
| JP | 10037321 | 2/1998 |
| JP | 11131611 A | 5/1999 |
| JP | 2008196248 | 8/2008 |
| JP | 4490340 B2 | 6/2010 |
| JP | 5968618 | 8/2010 |
| JP | 2011169094 A | 9/2011 |
| JP | 5002275 | 8/2012 |
| JP | 2012202177 | 10/2012 |
| JP | 2014218814 | 11/2014 |
| WO | WO2016040273 | 3/2016 |

OTHER PUBLICATIONS

From U.S. Appl. No. 15/446,732—cited as "Images of J-Bead believed to have been known in the art prior to Mar. 1, 2016".

* cited by examiner

VENTILATION SCREED DEVICE AND ASSEMBLY

This application is a continuation of application Ser. No. 16/194,775 filed Nov. 19, 2018 which claims priority to provisional patent application 62/592,612 filed Nov. 30, 2017. Each of these applications are incorporated herein by reference.

TECHNICAL FIELD

The present disclosure generally relates to a device configured to allow ventilation and the escape of water or other moisture in the form of vapor at locations below the top of a building or structure wall. Such conditions typically occur but are not limited to, locations above windows and doors and the juncture of dissimilar construction materials, and the bases of walls or transitions from floor to floor on multistory buildings.

BACKGROUND

For purposes of the foregoing specification and appended claims the term "vapor," whether or not accompanied by any words such as "moisture," "water" or other words describing similar matter or states of matter, refers to all forms of liquid and gases not limited to water, water vapor, moisture as created by any means.

This invention addresses the condition that walls hold vapor and moisture and their inability to allow vapor and moisture to escape so the wall can dry is a major factor in the premature deterioration of a structure. Building science, construction practices and emerging energy codes have changed greatly over recent decades resulting in significantly better insulated walls. Consequently these newer wall designs allow less means for vapor and moisture to escape and less air flow. This has led to increasingly premature deterioration of walls of buildings and structures.

Established wall designs and construction are intended to keep water out of walls but not necessarily to allow them to breathe. Building wraps traditionally prevent water intrusion but do not let moisture out. A better wall design must allow for moisture and vapor to move through a predetermined path depending upon when the inside and outside temperatures have the sufficient temperature difference to create and hold excess moisture.

Further, air pressure differential from inside and outside the wall due to temperature and or wind can force moisture into the wall through the wall's surface, in addition to preventing vapor and moisture from escaping. This prevents condensation from escaping and inhibits drying. Further, when cold air contacts hot air, or vice versa, condensation occurs and moisture is formed inside the walls of buildings and structures.

As a result, moisture and water accumulates without a means to escape causing the sheathing of walls to absorb moisture. Plywood, cement board, or OSB (Oriented Strand Board), which is more prone to absorb moisture, can begin to mold, deteriorate, rot and hold more water. As the sheathing fails the weight of the finish material will begin to crack. This allows more moisture accumulation in the walls. Ultimately the finish material can fall away from the building or structure. Areas receiving 20-inches or more of rain a year are the most susceptible to this type of deterioration.

Current building science, and construction materials and practices do not provide a clear and effective means for vapor to escape from different conditions within the walls of a building or structure. "J" bead and casing beads have been used at the base of walls as a possible means for vapor to escape. A misconception is that punched drainage holes in the ground allow moisture to escape. During installation of a stucco finish these holes become blocked and the only escape for vapor is through the stucco membrane or other cladding material which promotes accelerated deterioration. This method only works in areas where no or negligible rainfall is present.

Weep screeds have been used with stucco cladding and currently are the only the vapor escape method approved by building codes and standards. Again, the weep screed is ineffective because the path for vapor to escape a weep screed is the minute space created between the finish and the upper surface of the screed as the finish cures and shrinks.

Another problem area occurs at through wall penetrations such as above windows and doors. Casing beads with drip holes as disclosed above do not provide a reliable vehicle for vapor or water escape. Further, casing beads plus a drip edges create additional problems in their attempt at solving the vapor and water intrusion/vapor escape problems. The cutting trimming of drip edges to block the assembly from water intrusion is as much a problem as providing an escape for vapor.

U.S. Pat. No. 8,584,416 is a movement control screed which provides for the movement of adjacent upper and lower masonry coatings, allowing for some drainage of water only from the upper stucco panel. The patent teaches that the device is intended to keep water out by providing for movement at the floor plates. It does not teach or claim to allow the escape of vapor or for the wall to dry. There is no provision for incorporating a defined drainage plane, that is rainscreen. Further, this device was intended for wood framed and sheathed construction with a stucco finish above and stucco over masonry or block below. The patent does not cover a three coat stucco finish above and below or stucco above and stone below.

U.S. Pat. No. 7,673,421 is a device to allow for water drainage only at floor joints. The patent teaches that the device is intended to keep water out by providing for movement at the floor plates and not to allow for vapor to escape or for the wall to dry. There is no provision for incorporating a defined drainage plane, that is a rainscreen. Further, this device was intended for wood framed and sheathed construction with a stucco finish above and stucco over masonry or block below. The patent does not cover a three coat stucco finish above and below or stucco above and stone below.

U.S. Pat. No. 7,634,883 is a device intended to move exterior water in the form of rain or condensation and drip away from the structure. The patent does not teach or claim the escape of vapor from inside the wall or for the wall to dry, nor is there any allowance for incorporating a defined drainage plane, that is a rainscreen. Further, this device is limited to wood framed and sheathed construction with a stucco finish above and stucco over masonry or block below. The patent does not cover a three coat stucco finish above and below or stucco above and stone below.

Designs currently available only use casing beads, "J" beads, weep screeds and screeds for the mid wall juncture of finish at a floor line or dissimilar materials of a structure or a building. The current art does not facilitate the ventilation of a primary drainage cavity or the drying of the inside of the wall. Some of these areas of concern are at the base of full height walls and step walls, changes in roofline where a vertical element terminates into a non-vertical structure such as a dormer and roof for the removal of vapor from the wall.

In areas as noted above where greater rainfall is typical a more defined escape means for vapor and moisture is required over current methods.

Current commercially available accessories for stucco, stone and other finishes do not address these conditions and constraints on air and vapor flow throughout a wall. Therefore a new wall design and trim accessories are necessary to accommodate the different forms and function of the building envelope and prevent premature deterioration of the walls.

SUMMARY OF THE INVENTION

According to one aspect of the invention, a ventilation screed is provided comprising an upper attachment flange having a top portion and a bottom portion and at least one opening in the top portion; a drip edge protruding from the bottom portion of the upper attachment flange; a drainage cavity protrusion protruding from the bottom portion of the upper attachment flange above the drip edge, wherein the drainage cavity protrusion has a vertical portion of a L-shaped drainage trough portion and a bottom portion having at least one drainage opening along a meeting point of the upper attachment flange and the drainage cavity protrusion, an upper ground portion in communication with the L-shaped drainage trough portion and a drainage cavity shroud in communication with the upper ground portion, wherein the drainage cavity shroud extends past the drip edge.

BRIEF DESCRIPTION OF THE DRAWINGS

In the following section, the present disclosure will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and layouts have not been described in detail so as not to obscure the present disclosure.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term may be occasionally interchangeably used with its non-hyphenated version, and a capitalized entry may be interchangeably used with its non-capitalized version. Such occasional interchangeable uses shall not be considered inconsistent with each other. It is noted that various figures (including component diagrams) shown and discussed herein are for illustrative purpose only, and are not drawn to scale.

Figure 1:
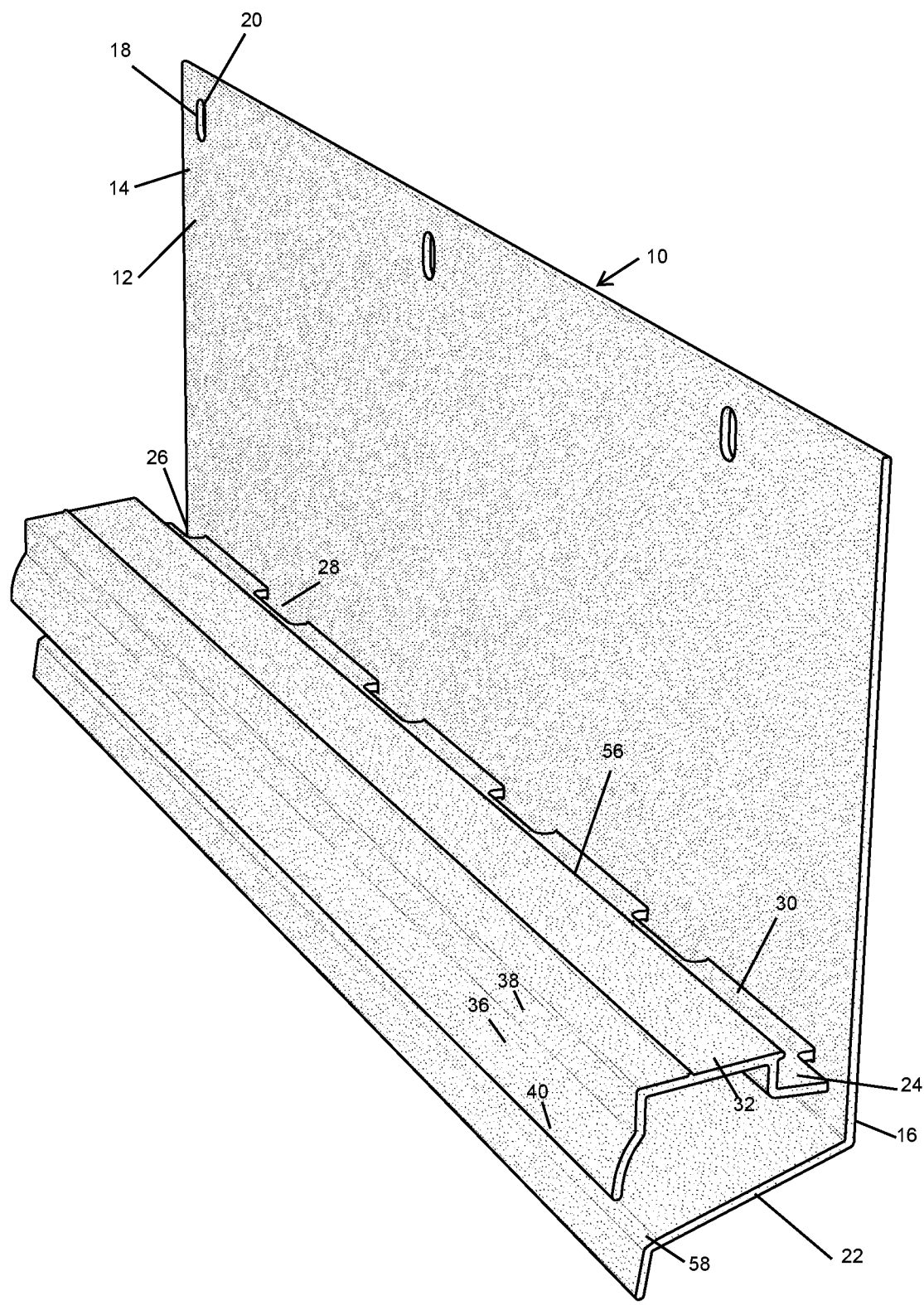
FIG. 1 depicts an isometric view of the present invention with a portion cutaway.

FIG. 1 depicts a ventilation screed (10) according to the present invention. The ventilation screed (10) comprising an upper attachment flange (12) having a top portion (14) and a bottom portion (16) and at least one opening (18) in the top portion. The term "top portion" generally refers to the top half of the upper attachment flange and the term "bottom portion" generally refers to the bottom half of the upper attachment flange. The at least opening (18) may be oval shaped (20) (for example 0.166"×0.300") and may be spaced four inches apart to accommodate a nail or other fastener attached through the opening to a stud. There may be a drip edge (22) protruding from the bottom portion (16) of the upper attachment flange (12); a drainage cavity protrusion (24) protruding from the bottom portion (16) of the upper attachment flange (12) above the drip edge (22), wherein the drainage cavity protrusion (24) has a vertical portion of a L-shaped drainage trough portion (34) and a bottom portion (30) having at least one drainage opening (e.g. 26 and 28) along a meeting point of the upper attachment flange (12) and the drainage cavity protrusion (24), an upper ground portion (32) in communication with the L-shaped drainage trough portion (34) and a drainage cavity shroud (36) in communication with the upper ground portion, wherein the drainage cavity shroud (36) extends past the drip edge (22). The drainage cavity shroud (36) may have a substantially vertical shroud portion (38) and a rounded shroud portion (40).

Figure 2:
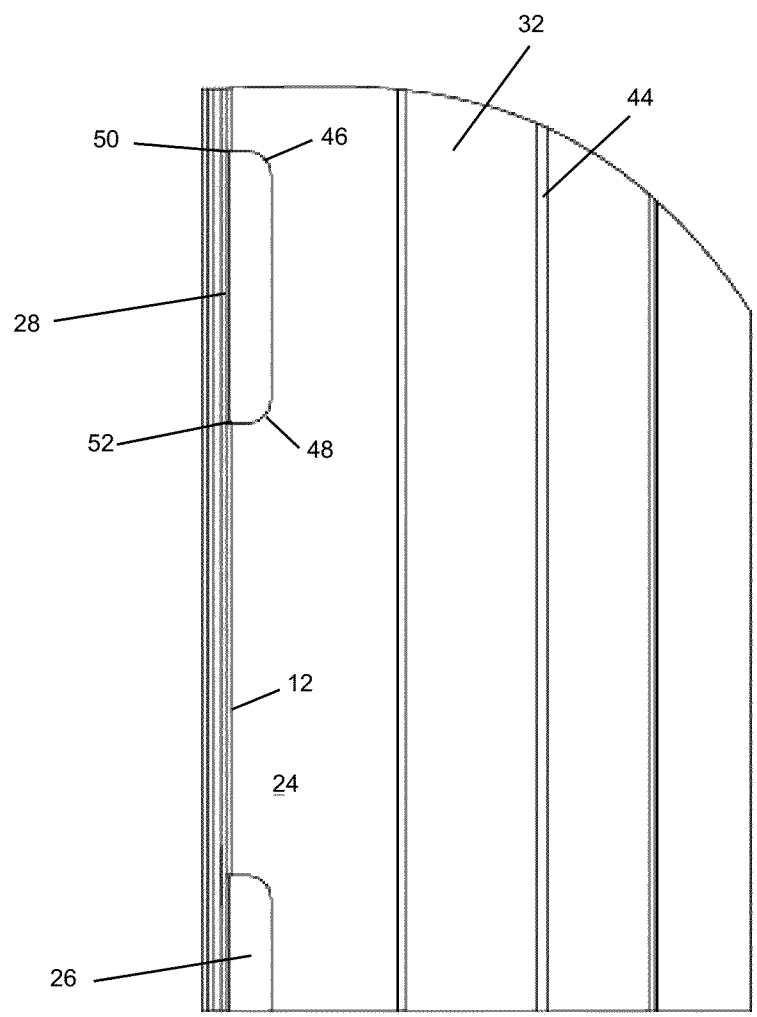
FIG. 2 depicts a top view of the present invention.

FIG. 2 depicts a top view of ventilation screed. Each of the drainage openings (e.g. 26 and 28) is located where the drainage cavity protrusion (24) meets the upper attachment flange (12) and may be a rectangular shape with rounded edges (e.g. 46 and 48) on a two corners of the rectangular shape that are away from the where the drainage cavity protrusion meets the upper attachment flange. Alternatively, the drainage openings may be a rectangular shape (see FIG. 1 of application Ser. No. 16/011,740 which has been incorporated by reference) located where the drainage cavity protrusion meets the upper attachment flange. As can be seen, the two corners of the rectangular shape (50 and 52) that are located where the drainage cavity protrusion meets the upper attachment flange are squared (i.e. not rounded). FIG. 2 also depicts a friction bead (44) in the upper ground portion. There may also be at least one friction bead along a portion of at least one of the upper attachment flange (shown in FIG. 1 as friction bead 56), the L-shaped drainage trough portion (shown in FIG. 1 as friction bead 56), the drip edge (shown in FIG. 1 as friction bead 58) and the drainage cavity (shown in FIG. 1 as friction bead 60).

Figure 3:
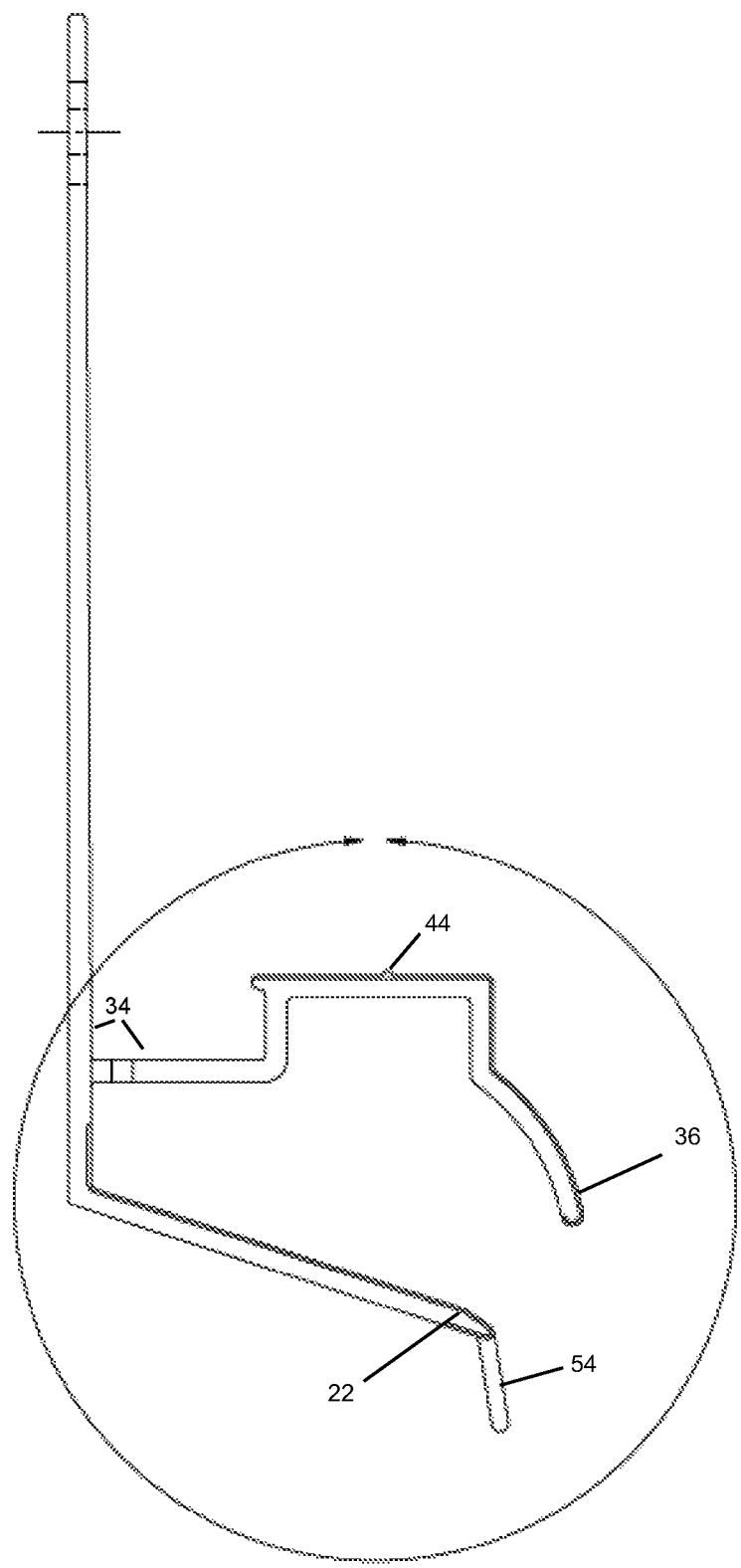
FIG. 3 depicts a side view of the present invention.
Figure 4:
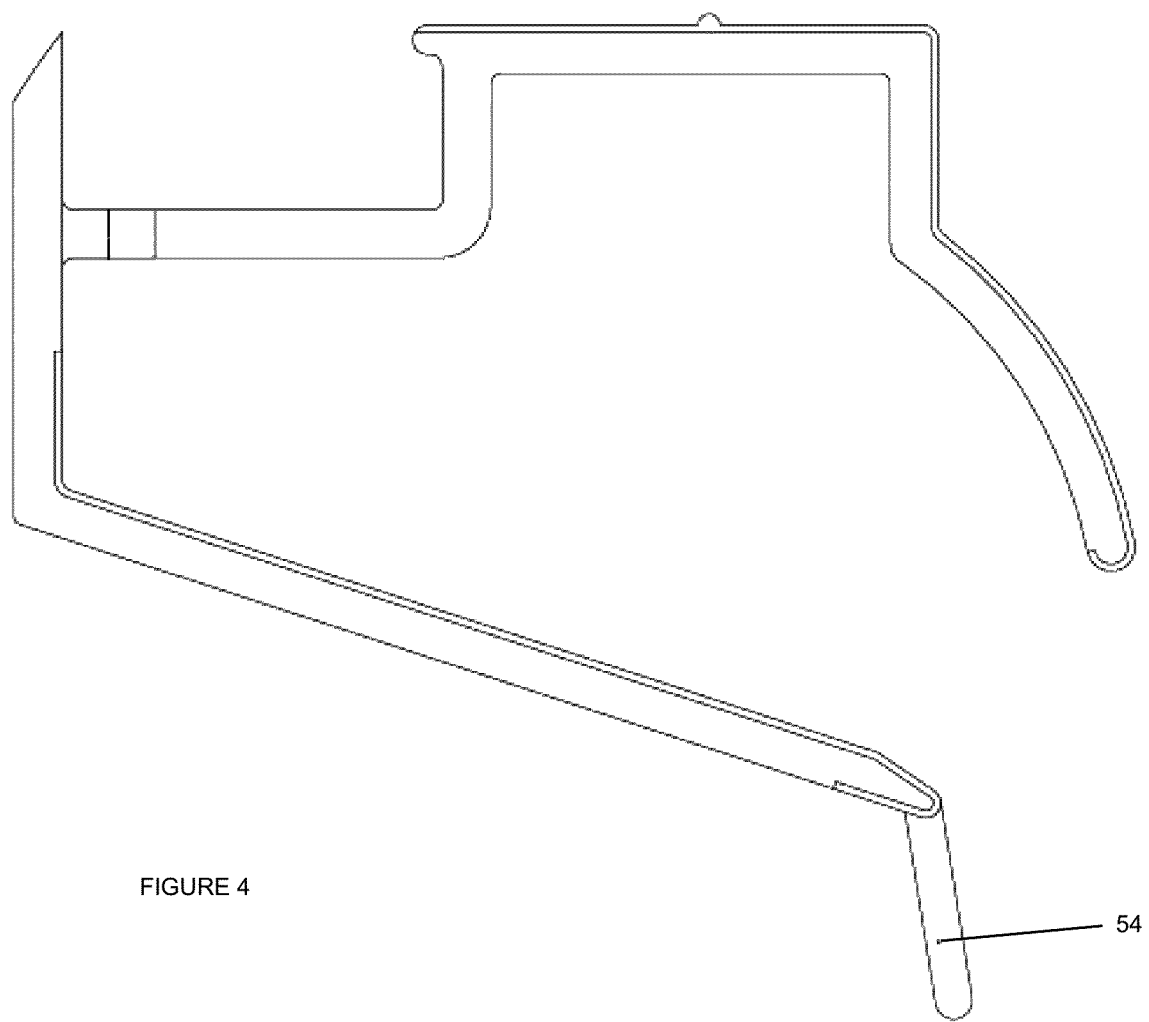
FIG. 4 depicts a side view of the present invention shown with a flexible leg.
Figure 5:
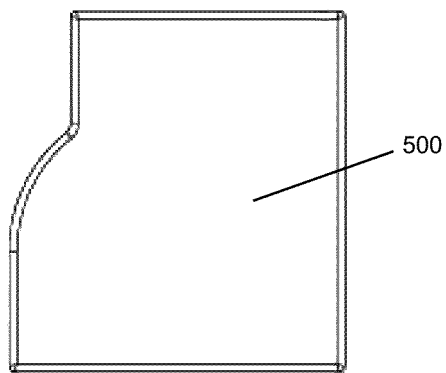
FIGS. 5, 6, 7 and 8 depict an end cap according to the present invention.
Figure 6:
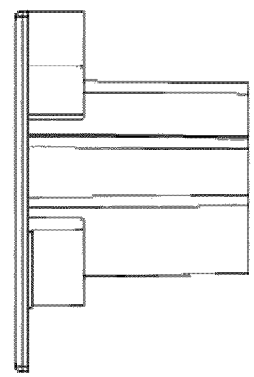
Figure 7:
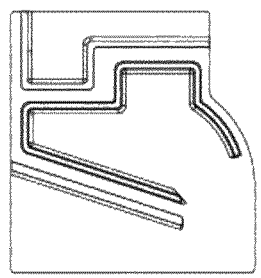
Figure 8:
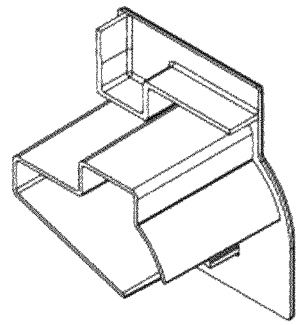
Figure 9:
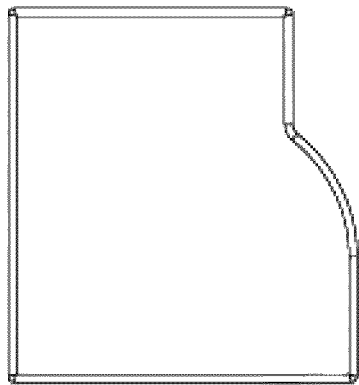
FIGS. 9, 10, 11 and 12 depict an end cap according to the present invention.
Figure 10:
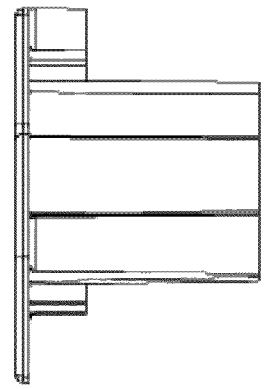
Figure 11:
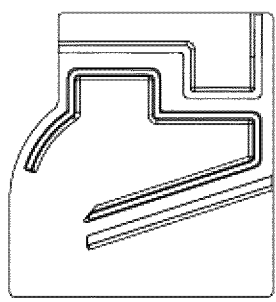
Figure 12:
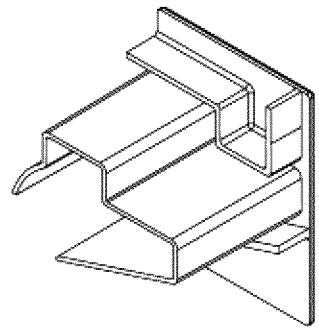
Figure 16:
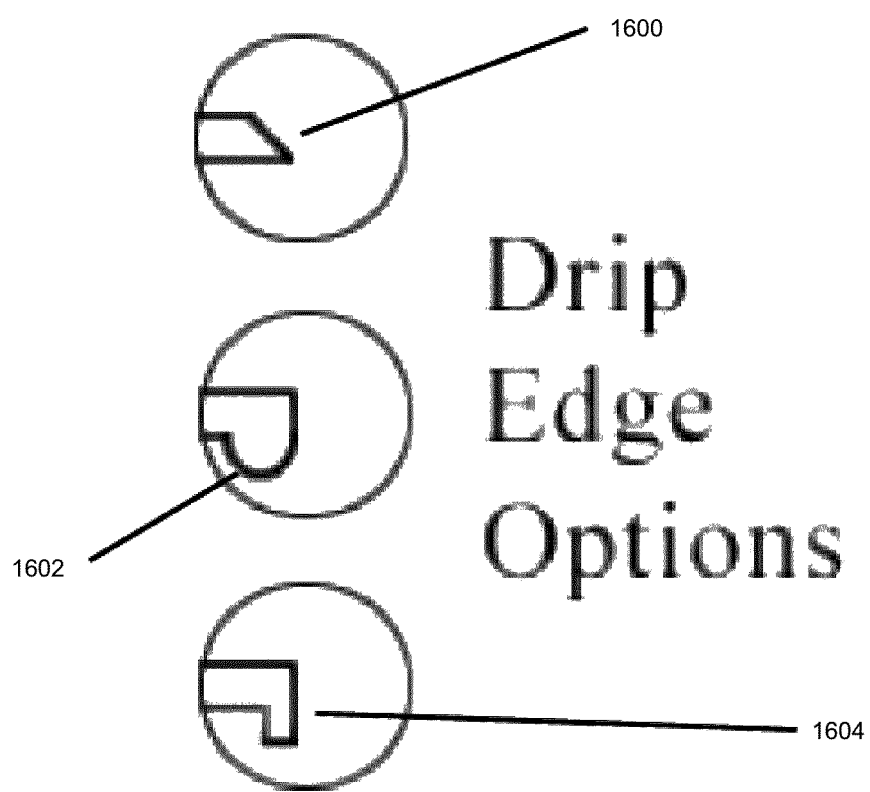
FIG. 16 depicts drip edge options.

FIGS. 3 and 4 depicts a side view of the ventilation screed. As can be seen the drainage cavity shroud (36) extends past the drip edge (22). There may also be a flexible leg (54) in communication with the drip edge (22). The drip edge (22) is angled downward in a direction away from the upper attachment flange (12). FIG. 16 depicts different drip edge options. For example, the drip edge may be an angled edge (1600), rounded edge (1602) and rectangular edge (1604).

Figure 13:
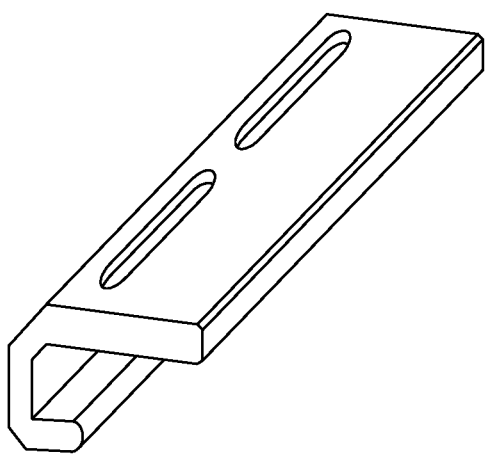
FIG. 13 depicts a connector according to the present invention.
Figure 17:
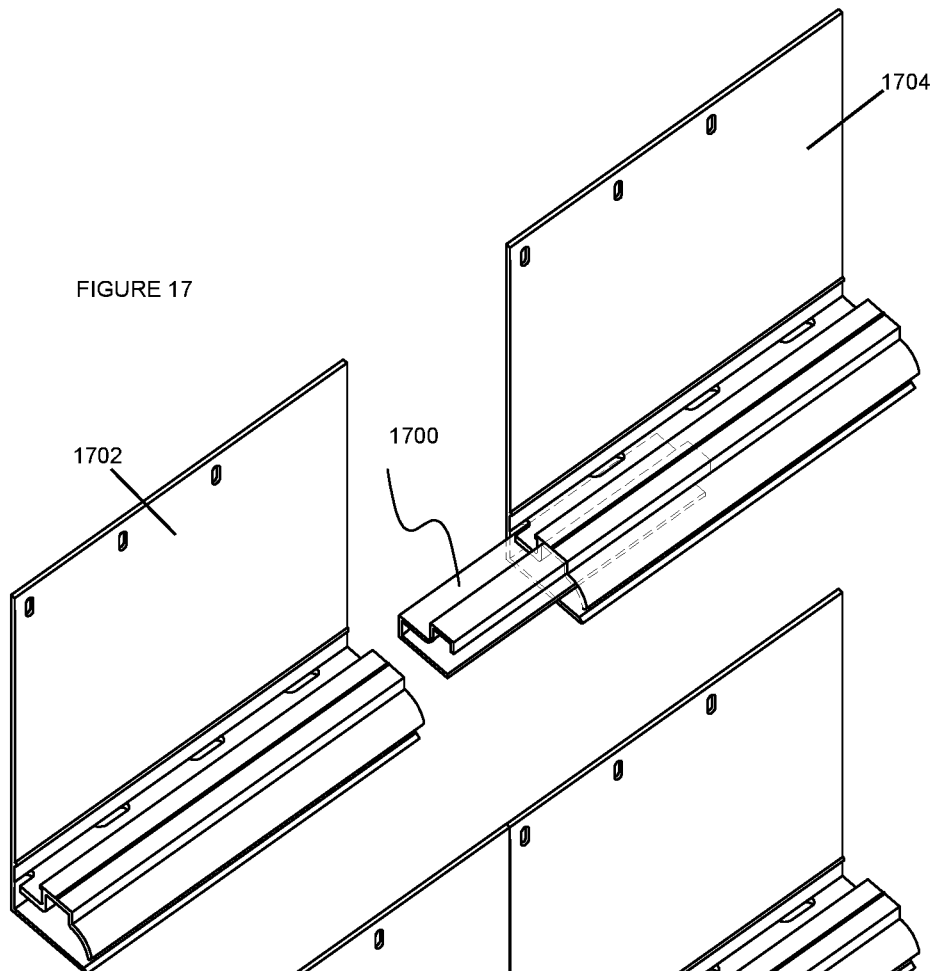
FIGS. 17, 18, 19 and 20 depict the present invention as installed with a connector.
Figure 18:
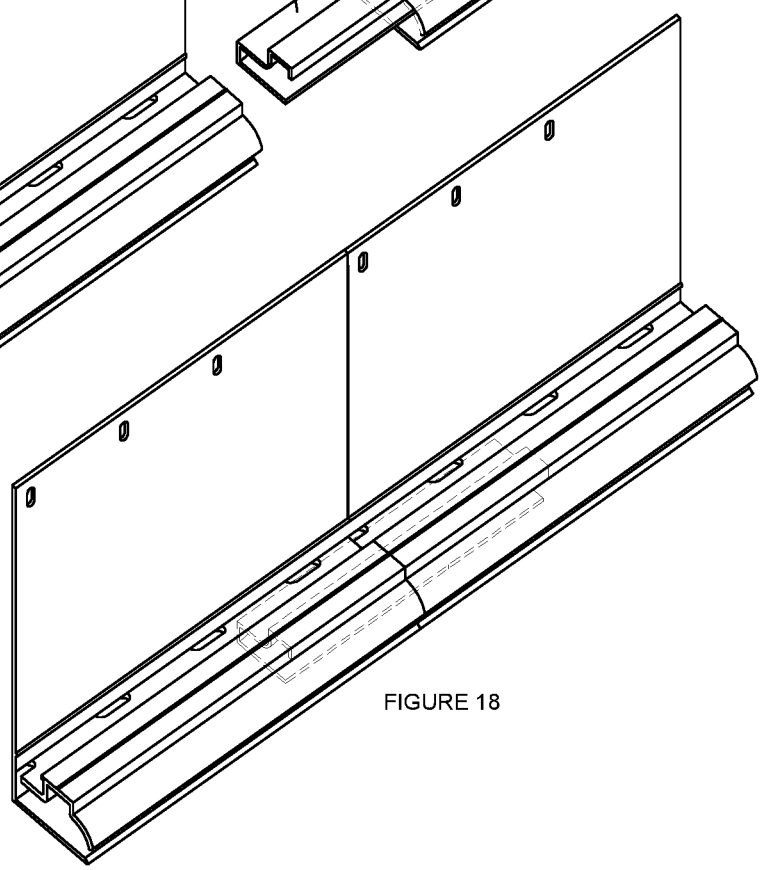
Figure 19:
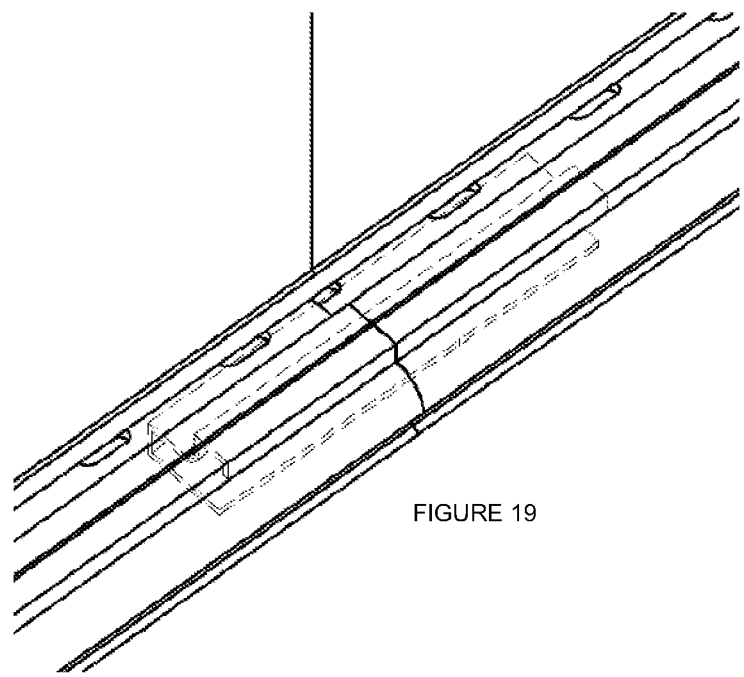
Figure 20:
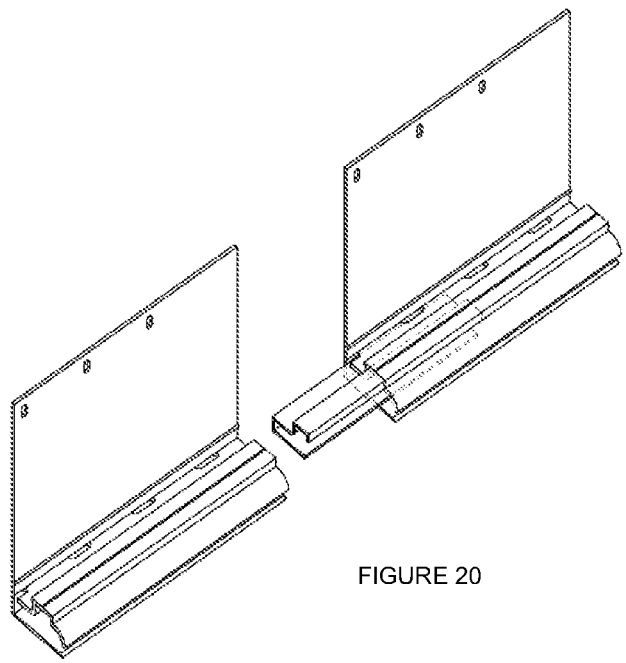
Figure 21:
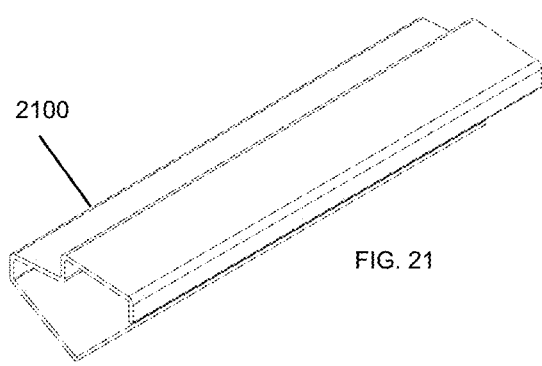
FIGS. 21, 22, 23, 24 and 25 depict examples of connectors according to the present invention.
Figure 22:
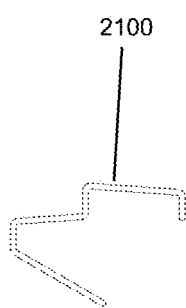
Figure 23:
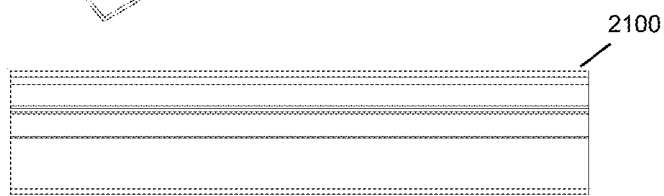
Figure 24:
Figure 25:
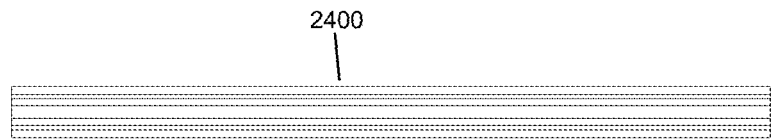

There may be a connector between two adjacent ventilation screeds. A "connector" accessory facilitates the straight, true and continuous installation of various embodiments of this invention. FIG. 13 depicts an example of a connector (1300). According this embodiment, the connector (1300) is a three sided connector that is smaller than and sits in a space between the drainage cavity protrusion and the drip edge of two adjacent ventilation screens. FIGS. 17, 18, 19 and 20 depict another example of a connector (1700) between a first ventilation screed (1702) and a second ventilation screed (1704). As shown in FIG. 17, the connector fits above the drip edge and below the drainage cavity protrusion (24), the vertical portion of a L-shaped drainage trough portion (34) and the substantially vertical shroud portion (38) of the drainage cavity shroud (36). Typically, it does not extend to the rounded shroud portion (40). FIGS. 18 and 19 depict that the connector sits between two adjacent ventilation screeds, but typically does not run the entire length of the connectors. A left portion of the joint connector sits in a first ventilation screed and a right portion of the joint connector sits in a second ventilation screed and the second ventilation screed is adjacent to the first ventilation screed. FIGS. 21, 22 and 23 depict an example of a connector (2100) which is shaped to correspond to the drainage cavity in which it sits. FIGS. 24 and 25 depict a more universal connector (2400) having a U shape with rounded corners at an angle. The angle is preferably between 13 and 17 degrees, most preferably 15 degrees to accommodate the drainage cavity, downward pressure above the connector and allowing the adjacent devices to align.

Figure 14:
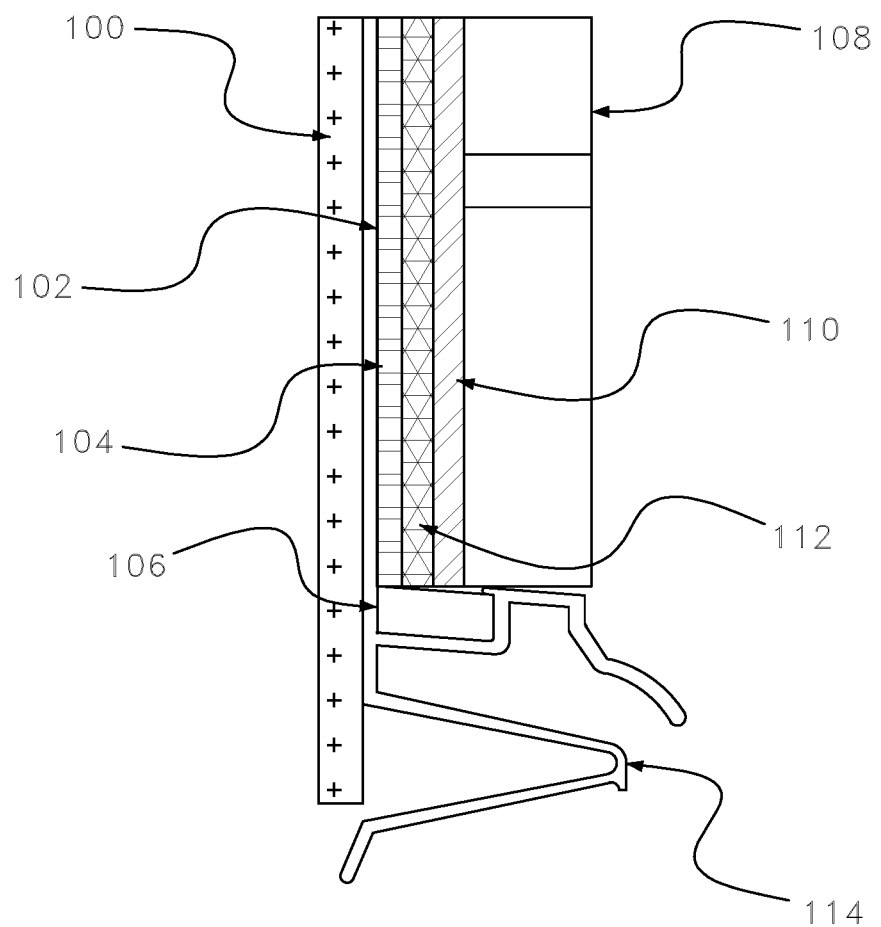
FIG. 14 depicts the environment in which the present invention may be installed.
Figure 15:
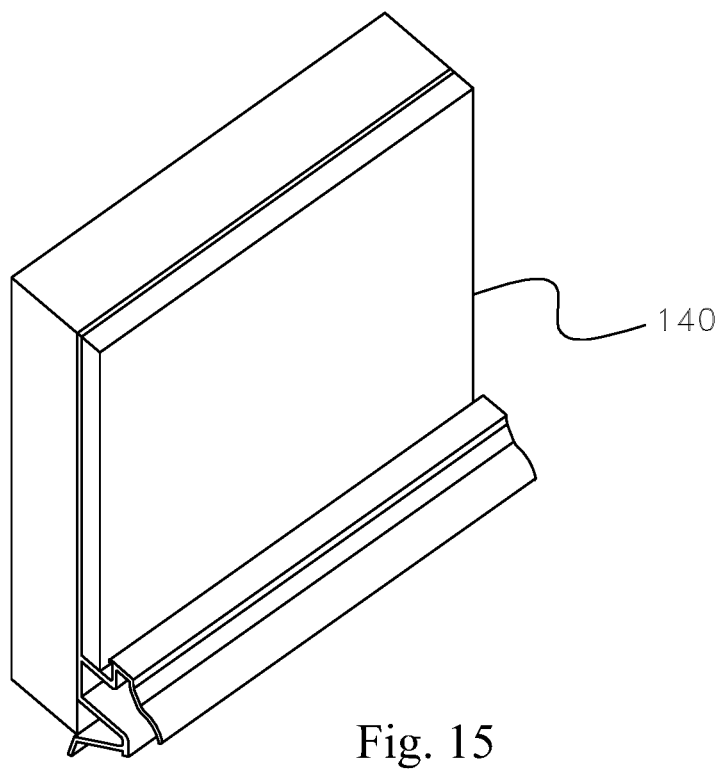
FIG. 15 depicts an example of the environment of the present invention as installed.

FIGS. 14 and 15 depict the larger environment of the ventilation screed as it may be installed according to one embodiment. As shown, the building may have sheathing (100), with building wrap (102), grade D paper (104), there may be an insect screen (106) in the L-shaped drainage trough portion. The insect screen (106) could be reticulated foam, it could be an unwoven polymer such as cellulose, nylon or spun polypropylene fiber, or it could be even a nylon or polypropylene screen, although that would be less durable. There may be "Green Screen™", or another rain screen (112) or solid or corrugated furring strips to the right of the ventilation screed (114), then lath (110) and brick or stone veneer (108). The "Green Screen™", or another rain screen (112) or solid or corrugated furring strips may be installed parallel to and between siding and the upper attachment flange portion. There may also be a screen (140) vertical and perpendicular to at least a portion of the upper attachment flange. There may also, or alternatively, be a mesh vertical and perpendicular to at least a portion of the upper attachment flange. There may also be reticulated foam (which may be in the same location as the rain screen (112) or solid or corrugated furring strips to the right of the ventilation screed (114), then lath (110) and brick or stone veneer (108). The reticulated foam insert may be installed parallel to and between siding and the upper attachment flange portion. The term "greenscreen" refers to a polypropylene entangled mesh, but it could also be described as a polymer strand matrix with a dimple structure. The greenscreen™ provides a drainage path and ventilation for moisture between the exterior wall finish and sheathing. It is a polymer strand matrix with a unique dimple design that exhibits superior compressive strength. When installed according to the present invention it allows over 99% of moisture and vapor to drain and escape from the wall. As shown in FIG. 15, there may also be a screen (140) parallel to at least a portion of the upper attachment flange. There may also, or alternatively, be a mesh parallel to at least a portion of the upper attachment flange. As shown in FIG. 14, there may be sheathing (100) a screen (112) parallel to at least a portion of the upper attachment flange (12).

FIGS. 5, 6, 7, 8, 9, 10, 11 and 12 depict an end cap. As shown, in FIG. 11, the end cap has an upper protrusion having a first horizontal portion (1100), a first vertical portion (1102), a second horizontal portion (1104) and a second vertical portion (1106) that extends above the first horizontal portion (1100). The end cap may also have a lower protrusion (1108) that is slanted downward substantially parallel to the drip edge (1110).

The present invention overcome the problems presented above and other problems relative to the escape of vapor and moisture from a wall, at locations below the top of the wall, as will be apparent to those skilled in the art of building cladding. As vapor is accumulated within a wall the flow of vapor can move by gravity or convection created by temperature, pressure or intrusion from outside the wall system. As temperature causes vapor to condense and move down the wall or pressure moves the vapor to a lower pressure area, this invention allows the moisture and vapor to escape at the invention's provided wall outlets. The present invention has common design elements above the surface adjacent to the lower surface of the drainage cavity. According to one of the embodiments an attachment flange with openings for nailing or other attachment means is provided. According to another embodiment this invention incorporates a primary drainage plane that will be installed on top of the attachment flange to continue an unobstructed movement of vapor and moisture. According to the present invention a drainage trough is located at the base of the attachment flange. The drainage trough provides a location for the rainscreen to seat. The trough is perforated with drainage openings to continue the unobstructed movement of vapor and moisture. According to present invention the trough with slotted openings provides the transition to the drainage cavity where vapor and moisture then passes to the exterior of the wall. According to the present embodiment a longitudinal edge acts as a screed in determining and helping to maintain a consistent thickness of finish. According to the present invention a shaped lip extends beyond the screed edge acting as a shroud to help prevent wind or pressure driven water from entering the walls of the building or structure. By introducing a primary drainage plane, vapor can escape from above by following the rainscreen down the outer surface of the attachment flange, through drainage trough, entering the drainage cavity and escape the wall further allowing the wall to dry. Embodiments of this invention can be incorporated into new construction or the remediation of worn or deficient walls of stucco, manufactured stone or systems utilizing continuous rigid thermal insulation.

The substantially solid upper attachment flange with multiple attachment openings is typically a planar surface that is attached to a vertical building wall. Attachment of the upper attachment flange is achieved with one of more nails, screws, other mechanical fasteners or adhesive. This upper attachment flange acts as a vapor barrier that can utilize rainscreen and or water resistant barrier, WRB, positioned on top of this flange. Vapor can move through heat exchange or gravity. The present invention provides a moisture removal assembly including drainage trough with friction beads and drainage openings that allow for vapor to follow the primary drainage plane into the drainage cavity and vapor to exit the wall between the drainage cavity shroud and drip edge. The friction beads provides an optional rainscreen with a snug fit with in the drainage trough. The lower surface of the drainage cavity is sloped and ending with a drip Edge to facilitate the escape of vapor in whatever form may exist. The device according to the present invention can terminate stucco at the base of a full height wall, base of a step wall, a change in roofline where a vertical element terminates into a non-vertical structure such as a dormer and roof for the removal of vapor from the wall, the header of a window or door or any other through wall penetration.

A device according to the present invention can terminate stucco at the base of a full height wall, base of a step wall, a change in roofline where a vertical element terminates into a non-vertical structure such as a dormer and roof for the removal of vapor from the wall. The lower surface of the Drainage Cavity is sloped ending at a formed Drip Edge all facilitating the outward movement of vapor in any form that may exist. The ventilation screed according to the present invention can terminate one finish at any location in a wall and start the same or new finish as design or need for vapor removal is desired. This embodiment of the device permits wall ventilation and escape of moisture where there is a break in the finish materials such as transitioning from one finish to another such as from stucco to thin veneer stone or continuous rigid thermal insulation or at the floor breaks on multi-story buildings. A "connector" accessory facilitates the straight, true and continuous installation of various embodiments of this invention. An optional predefined drip edge can be incorporated. The lower surface of the drainage cavity forms this drip edge. The surface is sloped to facilitate the escape of vapor in whatever form that exists. This device can accommodate additional thicknesses of finish not limited to veneer stone, manufactured brick, metal panels, cement panels, all with or without incorporating rigid insulation. The precise dimensions of the wall ventilation devices according to various embodiments of the present invention may vary from application to application as will be apparent to one of ordinary skill in the art.

As the invention has been described, it will be apparent to those skilled in the art that the same may be varied in many ways without departing from the spirit and scope of the invention. Any and all such modifications are intended to be included within the scope of the appended claims.

In the preceding description, for purposes of explanation and not limitation, specific details are set forth (such as particular structures, components, techniques, etc.) in order to provide a thorough understanding of the disclosed fencing system. However, it will be apparent to those skilled in the art that the disclosed system may be constructed in other embodiments that depart from these specific details. That is, those skilled in the art will be able to devise various arrangements which, although not explicitly described or shown herein, embody the principles of the disclosed system. In some instances, detailed descriptions of well-known components and construction methods are omitted so as not to obscure the description of the disclosed system with unnecessary detail. All statements herein reciting principles, aspects, and embodiments of the disclosed system, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A ventilation screed comprising:
   an upper attachment flange having a top portion and a bottom portion and at least one opening in the top portion;
   a drip edge protruding from the bottom portion of the upper attachment flange;
   a drainage cavity protrusion protruding from the bottom portion of the upper attachment flange above the drip edge, wherein the drainage cavity protrusion has a vertical portion of a L-shaped drainage trough portion and a bottom portion having at least one drainage opening along a meeting point of the upper attachment flange and the drainage cavity protrusion, wherein each of the drainage openings is a substantially rectangular shape with two corners of the rectangular shape having rounded edges that are away from the meeting point of the upper attachment flange and the drainage cavity protrusion;
   an upper ground portion in communication with the L-shaped drainage trough portion and a drainage cavity shroud extending substantially downward from the upper ground portion, wherein the drainage cavity shroud extends past the drip edge.

2. A ventilation screed as in claim 1, wherein the drip edge is angled downward in a direction away from the upper attachment flange.

3. A ventilation screed as in claim 1, wherein the drip edge has a shaped end selected from the group consisting of angled edge, rounded edge and rectangular edge.

4. A ventilation screed as in claim 2, further comprising a flexible leg in communication with the drip edge.

5. A ventilation screed as in claim 1, further comprising at least one friction bead along a portion of at least one of the upper attachment flange, the upper ground portion, the L-shaped drainage trough portion, the drip edge and the drainage cavity.

6. A ventilation screed as in claim 1, further comprising a connector between two adjacent ventilation screeds.

7. A ventilation screed as in claim 6, wherein the connector is a three sided connector that is smaller than and sits in a space between the drainage cavity protrusion and the drip edge of two adjacent ventilation screens.

8. A ventilation screed as in claim 1, further comprising a screen parallel to at least a portion of the upper attachment flange.

9. A ventilation screed as in claim 1, further comprising a mesh parallel to at least a portion of the upper attachment flange.

10. A ventilation screed as in claim 1, further comprising a reticulated foam insert that installed is parallel to and between siding and the upper attachment flange.

11. A ventilation screed as in claim 1, further comprising a joint connector, wherein a left portion of the joint connector sits in a first ventilation screed and a right portion of the joint connector sits in a second ventilation screed and the second ventilation screed is adjacent to the first ventilation screed.

12. A ventilation screed as in claim 1, further comprising an insect screen in the L-shaped drainage trough portion.

13. A ventilation screed as in claim 1, further comprising an end cap that covers a portion of the bottom portion of the upper attachment flange, the drip edge and the drainage cavity protrusion.

14. A ventilation screed as in claim 13, wherein the end cap has an upper protrusion having a first horizontal portion, a first vertical portion, a second horizontal portion and a second vertical portion that extends above the first horizontal portion.

15. A ventilation screed as in claim 13, wherein the end cap has a lower protrusion that is slanted downward substantially parallel to the drip edge.

* * * * *